(12) United States Patent
Wishman

(10) Patent No.: US 9,218,237 B1
(45) Date of Patent: Dec. 22, 2015

(54) NETWORK OF INTERCONNECTED CIRCUIT PROTECTION DEVICES

(71) Applicant: Amazon Technologies, Inc., Reno, NV (US)

(72) Inventor: Max Jesse Wishman, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 188 days.

(21) Appl. No.: 13/689,669

(22) Filed: Nov. 29, 2012

(51) Int. Cl.
*G06F 11/00* (2006.01)
*G06F 11/07* (2006.01)

(52) U.S. Cl.
CPC ............................ *G06F 11/0793* (2013.01)

(58) Field of Classification Search
USPC ........................................................ 714/4.1
See application file for complete search history.

(56) References Cited

U.S. PATENT DOCUMENTS

| | | | | |
|---|---|---|---|---|
| 8,326,467 | B2* | 12/2012 | Rivers et al. ................. | 700/297 |
| 8,333,316 | B2* | 12/2012 | Heath et al. ................. | 235/375 |
| 8,504,968 | B2* | 8/2013 | Newcomb ..................... | 716/120 |
| 8,595,515 | B1* | 11/2013 | Weber et al. .................. | 713/300 |
| 8,601,287 | B1* | 12/2013 | Weber et al. .................. | 713/300 |
| 8,621,248 | B1* | 12/2013 | Weber et al. .................. | 713/300 |
| 8,645,722 | B1* | 2/2014 | Weber et al. .................. | 713/300 |
| 8,700,929 | B1* | 4/2014 | Weber et al. .................. | 713/310 |
| 2003/0120981 | A1* | 6/2003 | Neunhoeffer et al. ........ | 714/100 |
| 2010/0085196 | A1* | 4/2010 | Stiver et al. .................. | 340/584 |
| 2012/0000975 | A1* | 1/2012 | Heath et al. ................. | 235/375 |
| 2012/0095612 | A1* | 4/2012 | Rivers et al. ................. | 700/297 |
| 2012/0131217 | A1* | 5/2012 | Delorme et al. ............. | 709/230 |
| 2012/0266121 | A1* | 10/2012 | Newcomb ..................... | 716/109 |
| 2012/0311370 | A1* | 12/2012 | Dasgupta et al. ............ | 713/340 |
| 2013/0058225 | A1* | 3/2013 | Casado et al. ................ | 370/250 |
| 2013/0336104 | A1* | 12/2013 | Talla et al. ................... | 370/216 |
| 2014/0078882 | A1* | 3/2014 | Maltz et al. .................. | 370/216 |
| 2014/0143419 | A1* | 5/2014 | Vyatkin et al. .............. | 709/224 |

OTHER PUBLICATIONS

Hines, Paul. Controlling Cascading Failures in Large Electrical Power Networks: A Decentralized Approach. Carnegie Mellon Conference on Crisis Readiness [online], Feb. 2006 [retrieved on Nov. 19, 2012]. Retrieved from the Internet< URL: http://www.epp.cmu.edu/domesticsecurity/PaulHines.pdf>.

* cited by examiner

*Primary Examiner* — Kamini Patel
(74) *Attorney, Agent, or Firm* — Kilpatrick Townsend & Stockton LLP

(57) ABSTRACT

A network of interconnected circuit protection devices in a datacenter that can communicate over a network. Each circuit protection device can have a management component such that each device could know the state of every other device or a centralized management component could know the state of all devices. The states of the protection devices could include, fault or non-fault (e.g., high-current, current-imbalance and high temperature). Using this information, the management component(s) can prevent a single-device failure from triggering circuit-protection devices in other sections of the data center to open. The breaker logic can operate such that if a single device short-circuited and all devices upstream in the power delivery system sensed the short-circuit, then the lowest-level device would open and if the fault was still detected upstream, then the next level device would open.

24 Claims, 9 Drawing Sheets

NETWORK OF INTERCONNECTED CIRCUIT PROTECTION DEVICES

BACKGROUND

A datacenter is a facility used to house a collection of computer servers and associated components, typically network hardware. The collection of computer servers is often called a "server cluster" or "server farm," and is designed to accomplish server needs far beyond the capability of a single machine. The networking hardware typically includes network switches and/or routers which enable communication between the different parts of the server farm and the users of the server farm.

Server farms are commonly used for cluster computing, web services, remote data storage, web hosting and other web services. Server farms are increasingly being used by enterprises instead of, or in addition to, mainframe computers. As a result, it is a common expectation that a datacenter's computer resources be available, even in times of catastrophic events.

One issue within datacenters is that a circuit issue, such as a short circuit, for a single device in a datacenter can trigger open circuit protection devices throughout the datacenter. This situation is problematic in that the result is that some datacenter devices are cut from power unnecessarily and the source of the circuit issue can be hard to find, slowing the process of restoring power to devices. Moreover, often a datacenter device, such as a server, will change its state upon losing power, so the source of the circuit error is often hard to detect.

BRIEF DESCRIPTION OF THE DRAWINGS

Various embodiments in accordance with the present disclosure will be described with reference to the drawings, in which.

DETAILED DESCRIPTION

Figure 1:
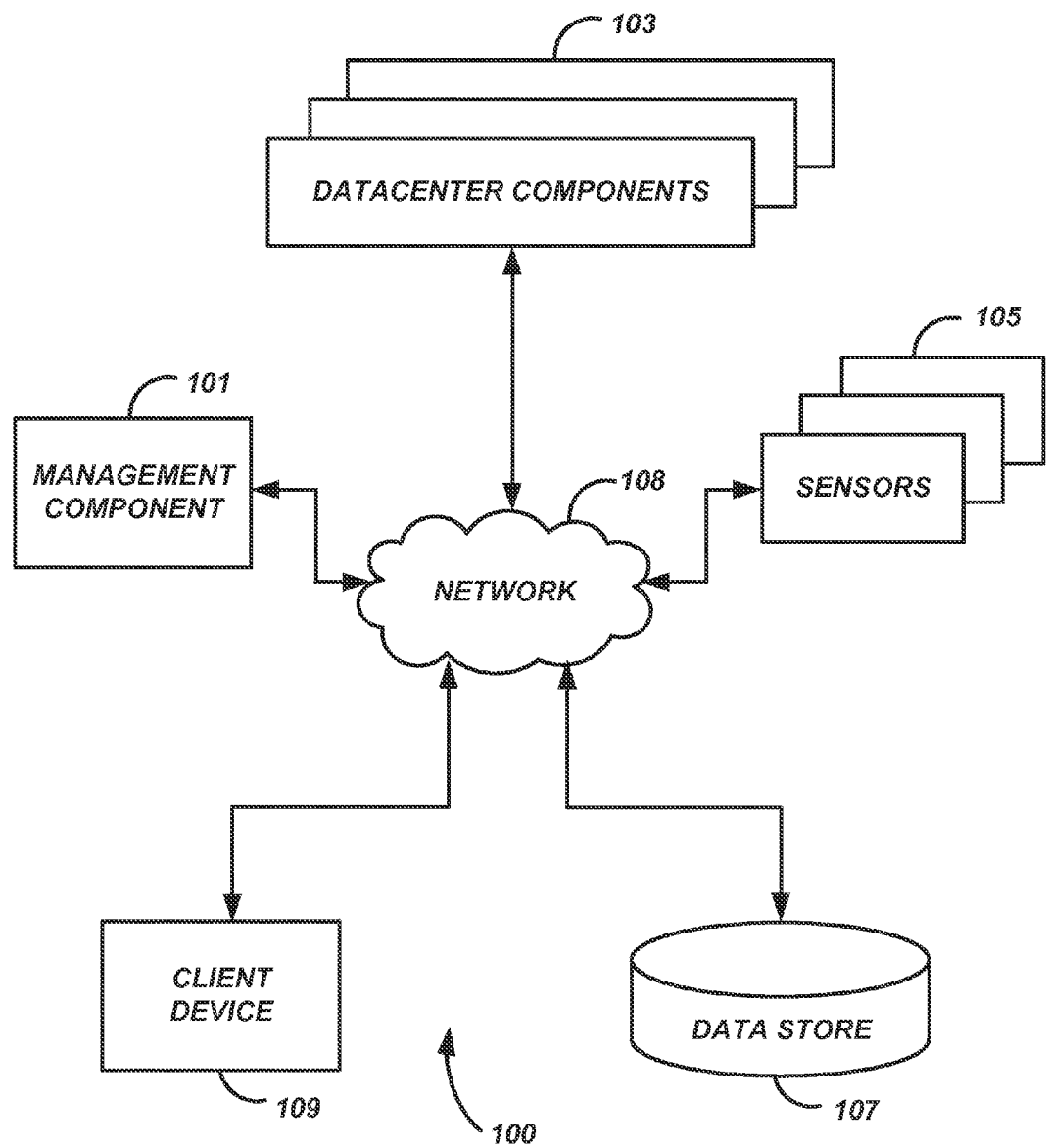
FIG. 1 is a block diagram of an illustrative datacenter environment including a management component in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In accordance with embodiments, intelligent circuit protection devices or an intelligent circuit device system are provided for a computing system, such as a datacenter environment. In embodiments, a management component is provided that is connected to multiple circuit protection devices. The management component receives information from the circuit protection devices in response to an event, such as a short circuit. Based upon the information received by the management component, the management component instructs the circuit protection devices to open or not.

Embodiments include a network of interconnected circuit protection devices (such as circuit breakers) in a datacenter that can communicate over a number of high speed links. Each circuit protection device can have a management component such that each device could know the state of every other device or a main computer could know the state of all devices. The states of the protection devices could include, fault or non-fault and/or opened or closed. Each device could also report on errors or warnings such as high-current, current-imbalance and high temperature. This would have application in a datacenter operating critical workloads where the owner of the datacenter would not want a single-device failure to trigger circuit-protection devices in other sections of the data center to open. The breaker logic can operate such that if a single device short-circuited and all devices upstream in the power delivery system sensed the short-circuit, then the lowest-level device would open and if the fault was still detected upstream, then the next level device would open. This way, a short circuit or other circuit fault anywhere in the data center would only shut down the minimum number of devices.

In embodiments, information about a circuit event, such as a short circuit, can be sent from multiple circuit protection devices in a hierarchy of circuit protection devices. The management component can instruct the lowest circuit protection device in the hierarchy to open and then to evaluate whether the error event is cleared or continuing. If continuing, then the management component can instruct the next circuit protection device up the hierarchy to open. An additional check can be made to see if the error event has cleared. This process can continue until the error event has cleared. By working up the chain from the lowest circuit protection device in the hierarchy, the minimum number of circuit protection devices are opened, thus allowing unaffected devices that are serviced by the circuit protection devices to continue operation.

In embodiments, a timeout sequence may be provided to prevent the management component from allowing an error event, such as a short circuit, to remain in place for too long.

In additional embodiments, all circuit protection devices receiving the signal can be opened immediately and the management component can close circuit protection devices from the highest point in a hierarchy down to a lowest point until an error situation is repeated. In this manner, the level in the hierarchy where a circuit error occurs can be quickly determined and can be handled accordingly.

In additional embodiments, each of multiple circuit protection devices includes its own management component. The management components can exchange information with one another or a centralized management component. Upon receiving information about an error event, such as a short circuit, the circuit protection device can request information from adjacent circuit protection devices and/or provide information to adjacent circuit protection devices so that the devices can collectively determine which of the circuit protection devices should opened.

An example datacenter environment or datacenter 100 is shown in FIG. 1. The datacenter 100 includes a management component 101, multiple datacenter components 103, sensors 105, a data store 107 and a client device 109. The various components may communicate via a network 108. In some embodiments, the datacenter 100 may include additional or fewer components than those illustrated in FIG. 1. For example, the number of datacenter components 103 may vary substantially, there may be no sensors 105 and so forth. Typically, components of the datacenter 100 are located in a single building or connected buildings, but one of more of the components, such as the management component 101 and/or the client device 109, can be located remote of the datacenter building complex and can be accessed remotely via the network 108.

The management component 101 can receive data from a number of sources, correct errors and reconcile data from one source to that of another, maintain and/or retrieve information from circuit protection and other devices, generate instructions on handling of circuit protection devices and respond to queries from the client device 109. For example, the management component 101 may receive data regarding the datacenter components 103 and operational characteristics of the datacenter components directly from the datacenter components, from the sensors 103, from the data store 107, from data entry (e.g., via the client device 109), or from some other source. As described below, the data may indicate the location, power system connectivity or status, circuit protection device condition or status, or other relative information about the datacenter and the various datacenter components 103. The management component 101 can reconcile the data received from the disparate sources (e.g., power information data from a sensor integrated with a datacenter component 103 against data from an independent sensor 105 nearby) and generate instructions for handling the datacenter components 103 and circuit protection devices for the datacenter 100. In some embodiments, the management component 101 can generate an alert to request human interaction with the device, for example in accordance with a playbook. In other embodiments, the management component 101 can generate instructions that are received by the datacenter component 103, such as circuit protection devices, to cause the datacenter component to react accordingly, e.g., to change state and/or operation.

The management component 101 and/or the client device 109 can be computing devices, such as server computers or desktop computers, configured with various hardware and software modules to implement the processes described herein. In addition, the management component 101 and/or the client device 109 can be physically located within a datacenter and thus may also be datacenter components 103. In some embodiments, the management component 101 or the client device 109 may be remote from the datacenter 100. If desired, the management component can be integrated with the client device 109 or physically co-located on the same computing device.

A user, such as a datacenter administrator or technician, can use the client device 109 to associate circuit protection devices or other datacenter components 103 and assign relationships among the devices. Relationships can also be automatically associated with datacenter components 103, such as with particular circuit protection devices. For example, all servers on a rack and/or their associated circuit protection devices can be automatically associated, or all racks and/or their associated circuit protection devices within a room can be associated. The client device 109 can also be used to establish and maintain strategies, or rules, for handling circuit protection devices upon a circuit fault event, such as a short circuit, an overcurrent situation, a ground fault, an overheating event and/or other events. The management component 101 can store these rules, for example in the data store 107 and, upon receiving information about an event, such as a short circuit, can handle or otherwise instruct the circuit protection devices or the datacenter components 103 to be handled in accordance with the rules.

Figure 2:
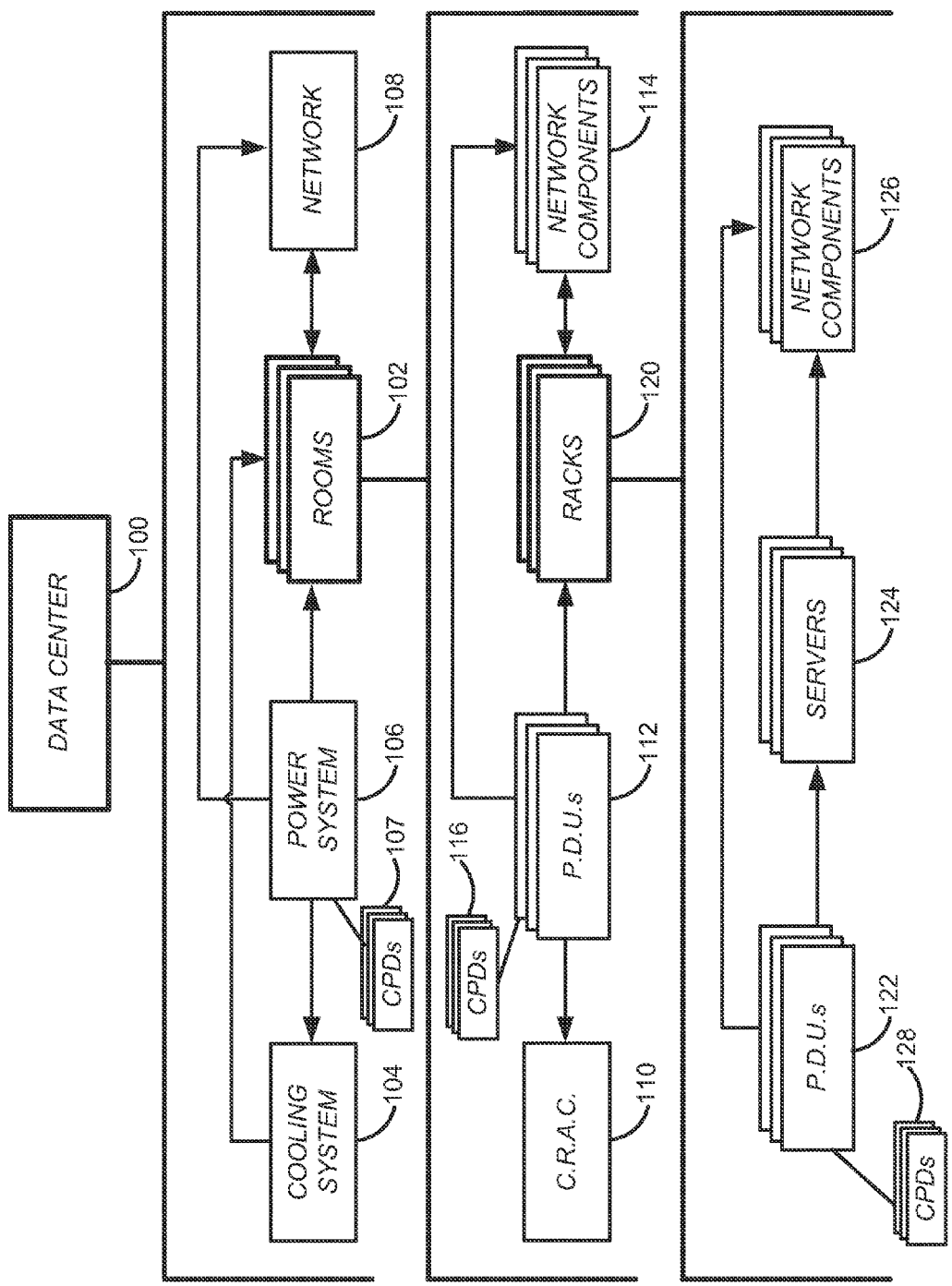
FIG. 2 is a block diagram of an illustrative datacenter hierarchy including datacenter components in accordance with embodiments.

FIG. 2 illustrates an example of datacenter components 103 that can be monitored and managed by the management component 101 of FIG. 1. The various datacenter components 103 may be included in implementation of the datacenter 100 to provide computing capacity, storage and other services to any number of customers or internal users. In some embodiments the datacenter 100 may have more or fewer components than are illustrated in FIG. 2.

The datacenter 100 may be part of a larger computing system operated by a network computing provider that includes several datacenters 100 across any number of geographical areas. The various datacenters 100 may communicate via a network, which can be the network 108 or another network. The network may be a wide area network (WAN), a collection of networks operated by distinct entities, such as the Internet, or some other network. A network computing provider can provide computing and storage capacity to a single operator, such as a single enterprise, such as a company or university. The computing services may include web hosting, data backup and mirroring, disaster prevention co-locations and the like. In another embodiment, the network computing provider provides such computing services and storage capacity to a variety of independent customers, such as a number of different business entities. In yet another embodiment, the network computing provider can provide computing services and storage capacity to users in the general public.

Customers may access the services on-demand or on a subscription basis. In some embodiments, the customers of the network computing provider may specify or select a particular computing device hardware and software configuration to use. Customers may then connect to a different physical computing device which satisfies the chosen hardware configuration each time the customer initiates a computing session. Virtual machine images of the chosen software configuration may be dynamically loaded or instantiated on a computing device as part of a computing session initialization process. In some embodiments, the software may not be a virtual machine image and the computing device need not be a different computing device for each computing session.

As can be seen in FIG. 2, the datacenter 100 can be represented by a hierarchy in accordance with embodiments. Broadly described, as shown by the hierarchy in the drawing, the datacenter 100 includes rooms 102, which in turn include racks 120. The racks 120 include servers 124 and/or network components 126.

As illustrated in FIG. 2, a datacenter 100 may include any number of rooms 102 in which computing devices and other datacenter components 103 that provide the services described above, or which support components which provide the services, are physically located. The datacenter 100 may also include a cooling system 104, a power system 106 and the network 108. For example, a datacenter 100 typically has a power system 106 that connects to a power source, such as the local power grid. The power system 106 may include a power generator for backup or as a primary power source. The power system 106 provides power to the various datacenter components 103, including the cooling system 104, the network 108 and also the rooms 102.

A room 102 may include any number of racks 120 of computing devices, a cooling system 104 component such as one or more computer room air conditioning (CRAC) units 110, any number of power system 112 components such as power distribution units (PDUs) 112 and any number of network components 114 in communication with the network 108 of the datacenter 100.

The PDUs 112 may include one or more rack-level PDUs 122 which each serve power to one or more racks 120. In such cases the room-level PDUs 112 may connect to rack-level PDUs 122 via cables and power whips. The rack-level PDUs 122 can then distribute power to the devices of the rack 120. In addition, the room-level PDUs 112 can provide power to the CRAC unit 110 and the network components 114.

The network components 114 include room-level switches and/or routers which facilitate communication between the computing devices housed in the racks 120, described below and the network 108 of the datacenter 100. For example, a room-level switch 114 may facilitate communication between computing devices on separate 120 racks within the same room. Additionally, the room-level switch 114 may, in combination with the core routers of the datacenter 100, facilitate communication between computing devices in different rooms 102, or even different datacenters 100 and other computing devices outside the network computing provider environment.

A rack 120 may be any frame or enclosure capable of mounting one or more servers or other computing devices. For example, the rack 120 can be a four-post server rack, a server cabinet, an open-frame two-post rack, a portable rack, a LAN rack, combinations of the same, or the like. In some embodiments, the computing devices mounted on the rack 120 may be networking components 126, such as switches or routers, instead of or in addition to servers. For example, a datacenter room 102 may have, in addition to racks 120 which contain servers 124, one or more racks 120 which may contain any number of switches. In some embodiments, a datacenter room 102 may contain only one rack 120, or may contain zero racks 120. For example, a datacenter room 102 may have servers 124 embodied as one or more large-scale computing devices, such as mainframes or midrange computers, which may not be grouped together physically in a rack 120.

A rack 120 may also encapsulate a number of datacenter components 103 and additional hierarchical levels, such as PDUs 122, servers 124 and network components 126. For example, a rack 120 may include any number of PDUs 122 and other datacenter components 103, such as power whips and the like, for providing power from the room-level PDUs 112 to the servers 124 and network components 126 mounted in or associated with the rack 120. The network components 126 of the rack 120 can include top-of-rack (TOR) switches which provide network connectivity between the room-level network components 114 and the servers 124. The network components 126 can also be powered by the rack-level PDUs 122.

Each server 124 can comprise additional datacenter components 103, each of which may be monitored, such as a processing unit, a network interface, computer readable medium drive and a memory. The memory generally includes RAM, ROM and/or other persistent or non-transitory memory and may contain a hypervisor for managing the operation and lifetime of one or more virtual machine (VM) instances.

In operation, a customer may initiate processing on a server of the datacenter 100 by transmitting network communications via the Internet to the datacenter 100. The communications can be routed through the network 108 of the datacenter 100, passing through a core switch and to a room-level network component 114, such as a switch, of a particular room 102. From there, the communications are passed to a rack 120, where they pass through a rack-level network component 126, such as a TOR switch, before ultimately arriving at a server 124. The server 124 may be a fixed host which performs internal processing, such as routing the communication to another server 124 where a VM for the customer will be launched to process the communication and provide the customer computing session. As will be appreciated, such an operation can involve additional communications sent over multiple rack-level network components 126, room-level network components 114 and components of the network 108 of the datacenter 100 before arriving at a server 124 that will launch a VM for the customer in a different room 102 of the datacenter 100.

The server 124 which launches the VM for the customer may receive power, through a power cable, from a rack-level PDU 122 of the rack 120 on which the server 124 is located. The rack-level PDU 122 may in turn receive power through one or more "power whips" or cables from a room-level PDU 112. The power may pass through any number of PDUs in between the rack-level PDU 122 and room-level PDU 112. The room-level PDU 112 can draw power from the power system 106 of the datacenter 100. The power may come from another PDU or directly from an on-site generator or power source, or from a link to the local power grid outside of the datacenter 100.

One or more circuit protection devices (CPDs) 116, 128, such as circuit breakers, fuses and ground fault circuit interrupters, can be provided for use in protecting the electrical circuits in the datacenter 100. In general, the circuit protection devices are designed to protect an electrical circuit from damage caused by a circuit event, such as overload, short circuit, overheating, or a ground fault, as examples. One or more room-level CPDs 116 can be dedicated to one or more racks 120 of datacenter components 103, or one or more rack-level CPDs 128 can be dedicated to one or more datacenter components (e.g., connected to or associated with the PDU 122) such as servers 124, which can be located on one or more racks. In addition or as an alternative, one or more CPDs 107 can be provided that are dedicated to one or more datacenter components 103 distributed through the datacenter 100.

Figure 3:
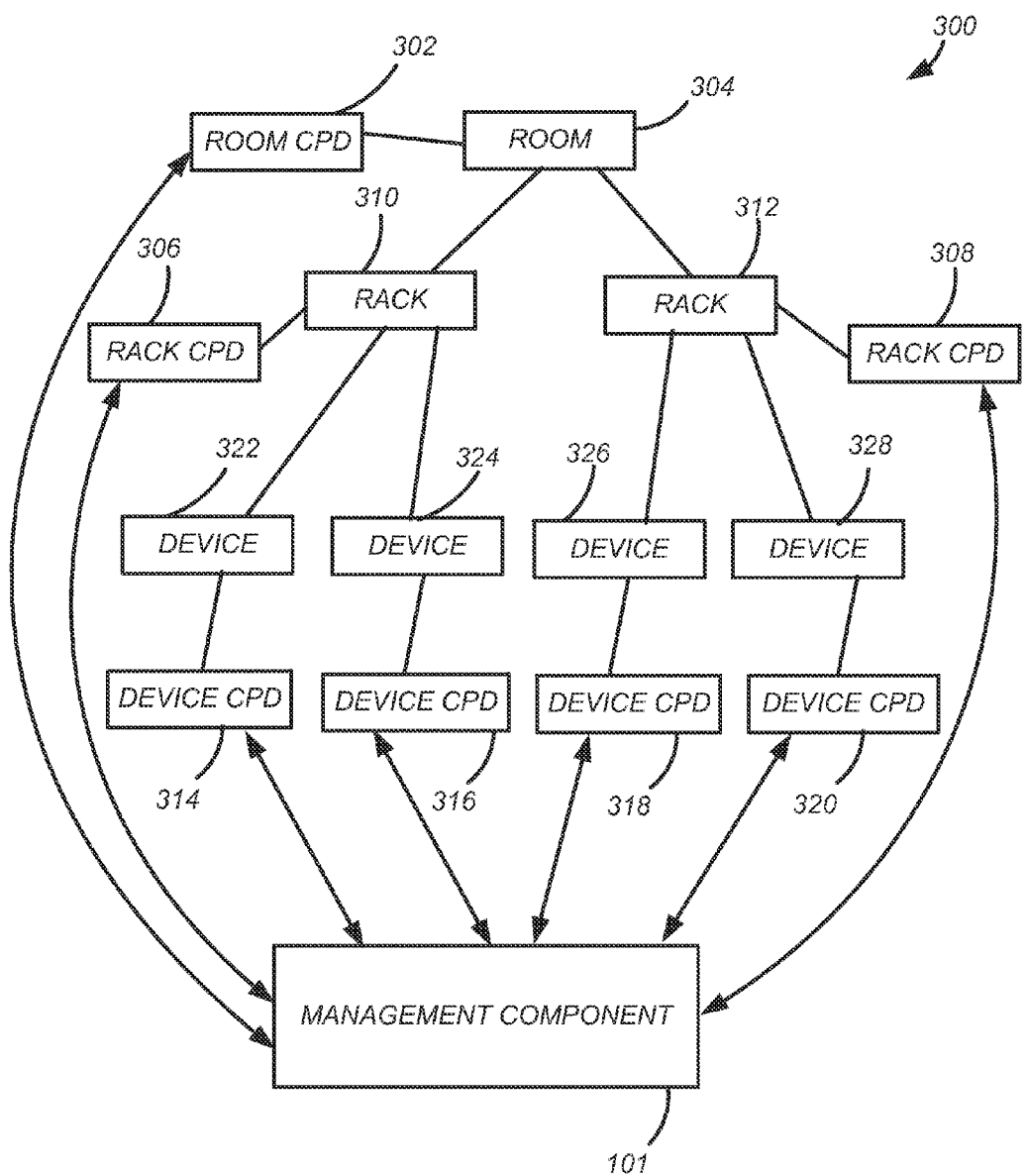
FIG. 3 is a block diagram representing a hierarchy of circuit protection devices for datacenter components in accordance with embodiments.

FIG. 3 is a block diagram representing a circuit protection device system 300 in accordance with embodiments. As can be seen in the figure, the circuit protection device system 300 is arranged in a hierarchy, with multiple circuit protection devices throughout the hierarchy.

The hierarchy in FIG. 3 is represented at three different levels: room, rack and device. However, any hierarchy could be used and there could be multiple different levels among the room, rack and device levels, or above and below these levels.

At the highest level, a room CPD 302 provides circuit protection for a room 304. Rack CPDs 306, 308 provides circuit protection for racks 310, 312. Device CPDs 314, 316, 318, 320 provide circuit protection for devices 322, 324, 326, 328. All of the CPDs in FIG. 3 communicate with the management component 101.

Figure 4:
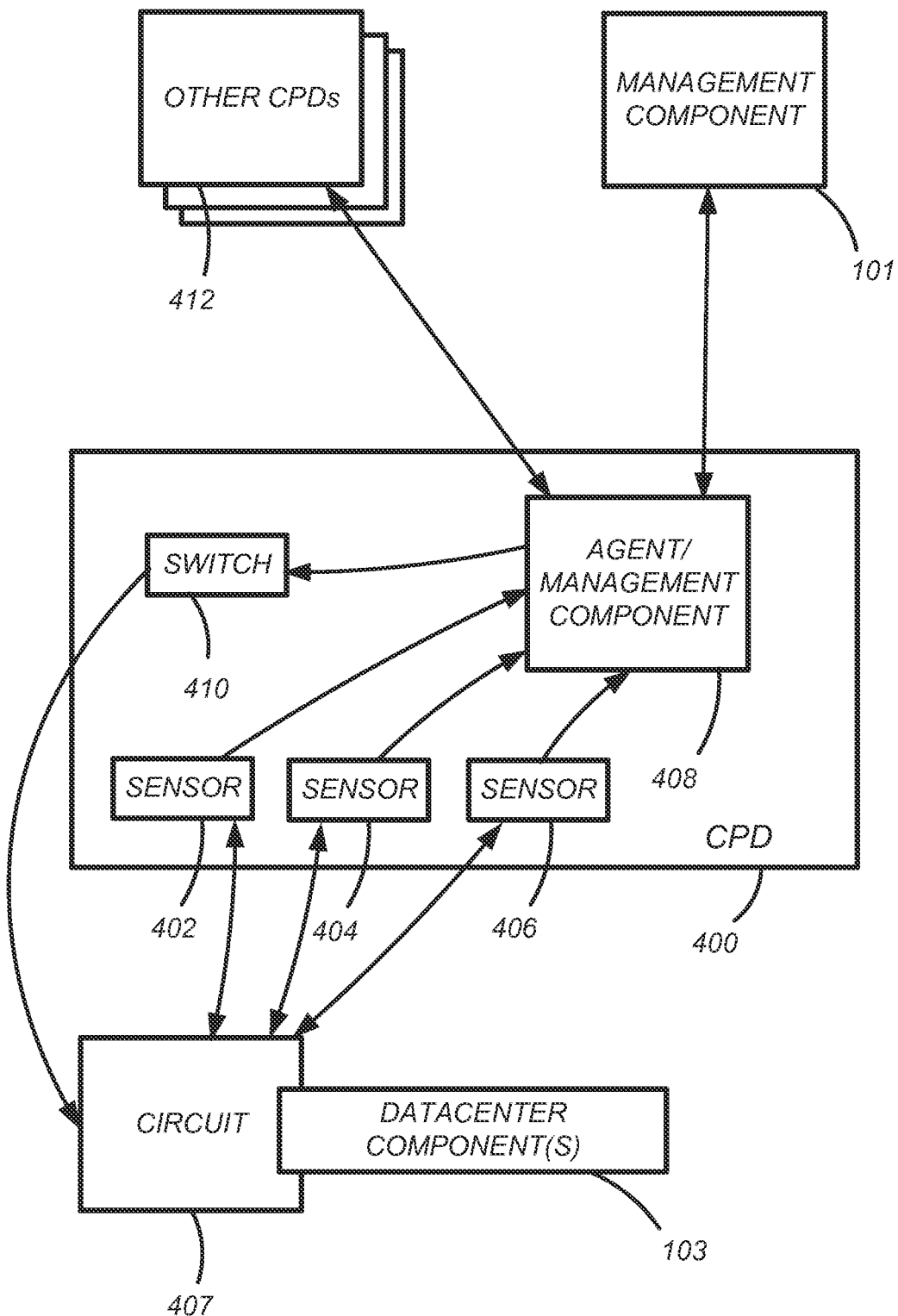
FIG. 4 is a block diagram representing a circuit protection device in accordance with embodiments.

FIG. 4 shows a CPD 400 that can be used, for example, in the CPD system 300 or in other embodiments herein. The CPD includes one or more sensors 402, 404, 406 that can mechanically or electronically sense a circuit error event, such as a short circuit, over circuit, overheating, ground fault, or other circuit fault error event. The sensors can receive information about the event from one of the sensors 107 (e.g., about an overheating event adjacent the CPD) or from a circuit 407 which can provide power to a device, rack, room, or another datacenter component or components 103. A single sensor can be provided for providing information about all types of fault events, but, in embodiments, multiple sensors are provided to distinguish different error events, so the specific information can be communicated to the management component 101 or can otherwise be utilized.

The CPD 400 includes an agent or management component 408. In embodiments, the agent/management component 408 includes provides information from the sensors 402, 404, 406 to the management component 101 and receives instructions from the management component 101. In other embodiments, described below, the agent/management component 408 provides many or some of the functions of the management component 101. The functions of the management component 101 described herein can be distributed as desired between and the agent/management component 408 and the management component 101 and/or all functions can be provided in the agent/management component 408 of the CPDs. In embodiments, as described below, the agent/management component 408 can also or alternatively communicate with other CPDs 412, for example the agent/management components 408 of those CPDs. An example of one of these embodiments is described below.

Unlike prior art CPDs, the CPD 400 typically does not automatically, upon the detection of an error event (e.g., a fault condition), automatically open a circuit (e.g., the circuit 407). Instead, as described herein, the agent/management component 408 instructs a switch 410 to open the circuit 407 in response to instructions from the management component 101 and/or instructions maintained by the agent/management component 408. These instructions are typically rules that have been established to react based upon information received from the sensors 402, 404, 406.

Figure 5:
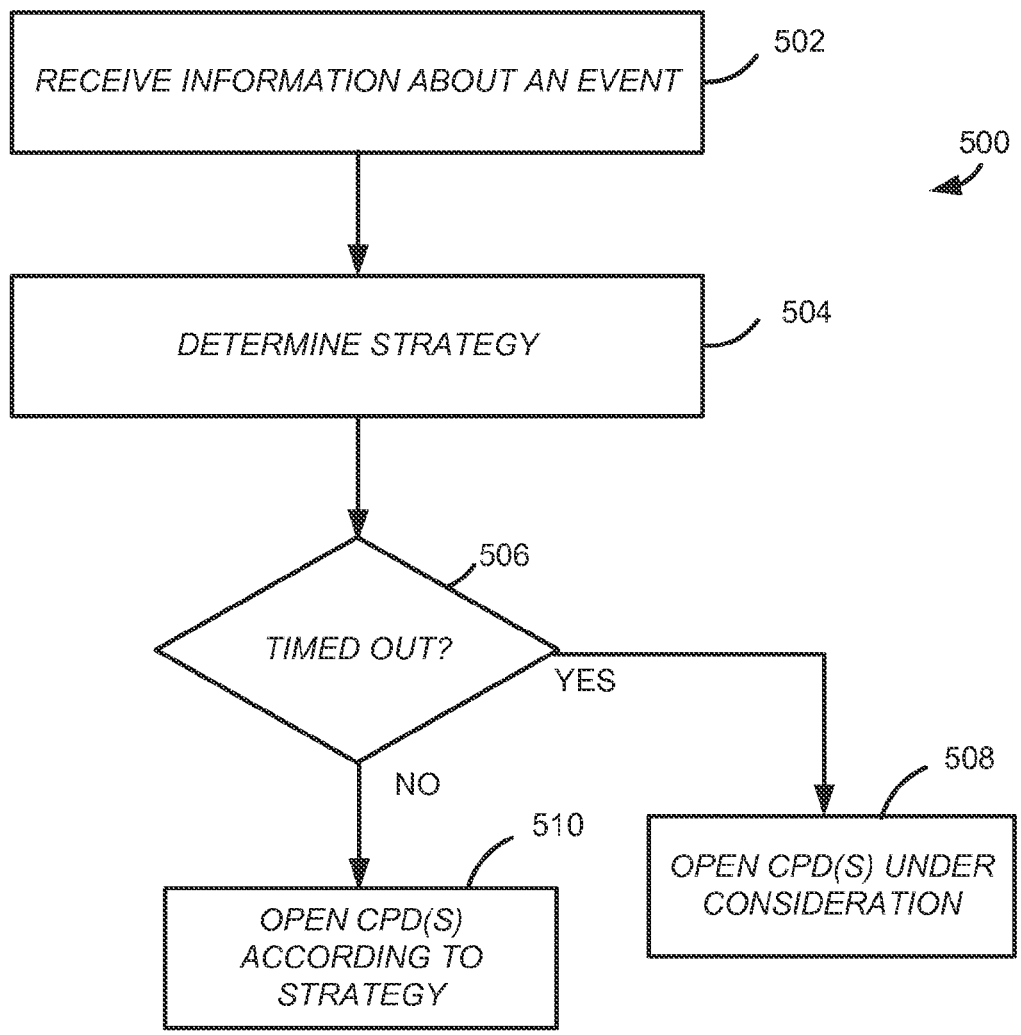
FIG. 5 is a flowchart showing a process for handling circuit protection devices in accordance with embodiments.

FIG. 5 is a flowchart representing a process 500 for management of circuit protection devices in accordance with embodiments. Some or all of the process 500 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Beginning at 502, information is received about a circuit error event. This information may be received, for example, by the management component 101 and/or the agent/management component 408. The information may be, for example, information about a short circuit event, an over current event, a ground fault event or another event in the circuit 407 as detected by one of the sensors 402, 404, 406.

Alternatively or additionally, the information can be received from other CPDs 412. These adjacent CPDs 412 may be, for example, CPDs at the same level, a higher level and/or a lower level of the hierarchy shown in FIG. 3. The status of these other CPDs can be relative to the same event that creates a fault situation at the CPD 400. For example, if a short occurs at a device level, the short can be detected at rack and/or room levels.

Thus, the event can include information from multiple CPDs, possibly all received at once by the management component 101 and/or the agent/management component 408. The management component 101 and/or the agent/management component 408 can utilize this information for determining a strategy at 404. The strategy may be, as described earlier, information that is maintained in the data store 107 or other rules that are maintained for handling particular strategies.

In embodiments, the strategy decision and instruction by the management component 101 and/or the agent/management component 408 happens in a matter of milliseconds to address a particular error event in circuits of the datacenter 100. Otherwise, if the decision process is too long, the error event can cause damage to one or more devices in the datacenter 100. Thus, in accordance with embodiments, at 506, if an amount of time has passed and a strategy has not been implemented, then 506 branches to 508 and the management component 101 and/or the agent/management component 408 can instruct one or more CPDs 400 and/or 412, to open.

If time has not expired, then 506 branches to 510 where, in accordance with the strategy of 504, one or more CPDs 400 and/or 412 are changed in state. In this example, the change in state is from normally closed to opened, which is typical in many CPDs, but other state changes can be made. Some options for how decisions are made regarding which CPDs are to be opened or described in following embodiments.

Figure 6:
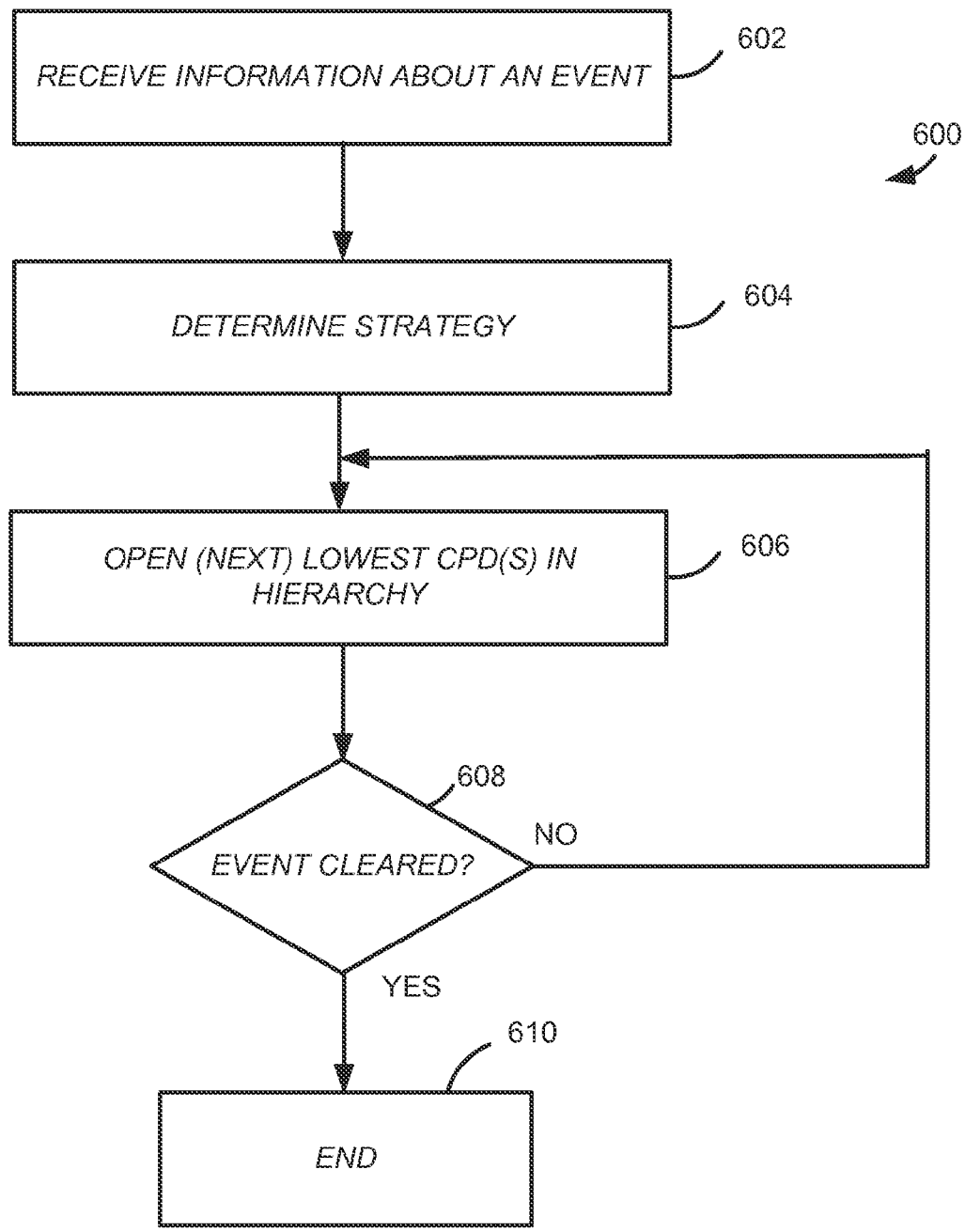
FIG. 6 is a flowchart showing another process for handling circuit protection devices in accordance with embodiments.

FIG. 6 is a flowchart representing a process 600 for implementing a particular strategy for managing the CPDs in accordance with embodiments. 602 and 604 are similar to 502 and 504 described above. At 606, the lowest CPD or CPDs in the hierarchy of CPDs from which an error event is received are opened. For example, if an error event is received from the room CPD 302, the rack CPD 306 and the device CPD 314, then the CPD 314 is opened.

At 608, if the event is not cleared after opening the lowest CPD in 606, then the process loops back and the next lowest CPD is opened. In this example, that would be the rack CPD 306. If the event is cleared after the lowest CPD has been opened, then 608 branches to 610, where the process is done.

The process 600 enables, in an automatic fashion, for a lowest CPD to be opened, followed up the hierarchy to the highest CPD. Thus, even though CPDs at each level of the hierarchy have received an error, the error can be isolated to a particular device or at a lower level in the hierarchy by opening the CPDs in succession. In some events, multiple CPDs at a single level may receive and/or generate error event information. In such a case, then all or a subset of all CPDs can be opened at that level. In either event, the process 600 permits a fewer number of circuits for devices to be opened than in prior art systems because, once an event is cleared, higher CPDs in the hierarchy are not opened.

In addition to providing the benefit of allowing higher order devices to keep operating (because the associated CPD for the higher order device is not opened), the process 600 permits a management component 101 to know the level at which an event likely occurred. Thus, this information can be provided to an operator so that maintenance or other repairs can be done at the proper level. This information can be used in another manner, if desired.

Figure 7:
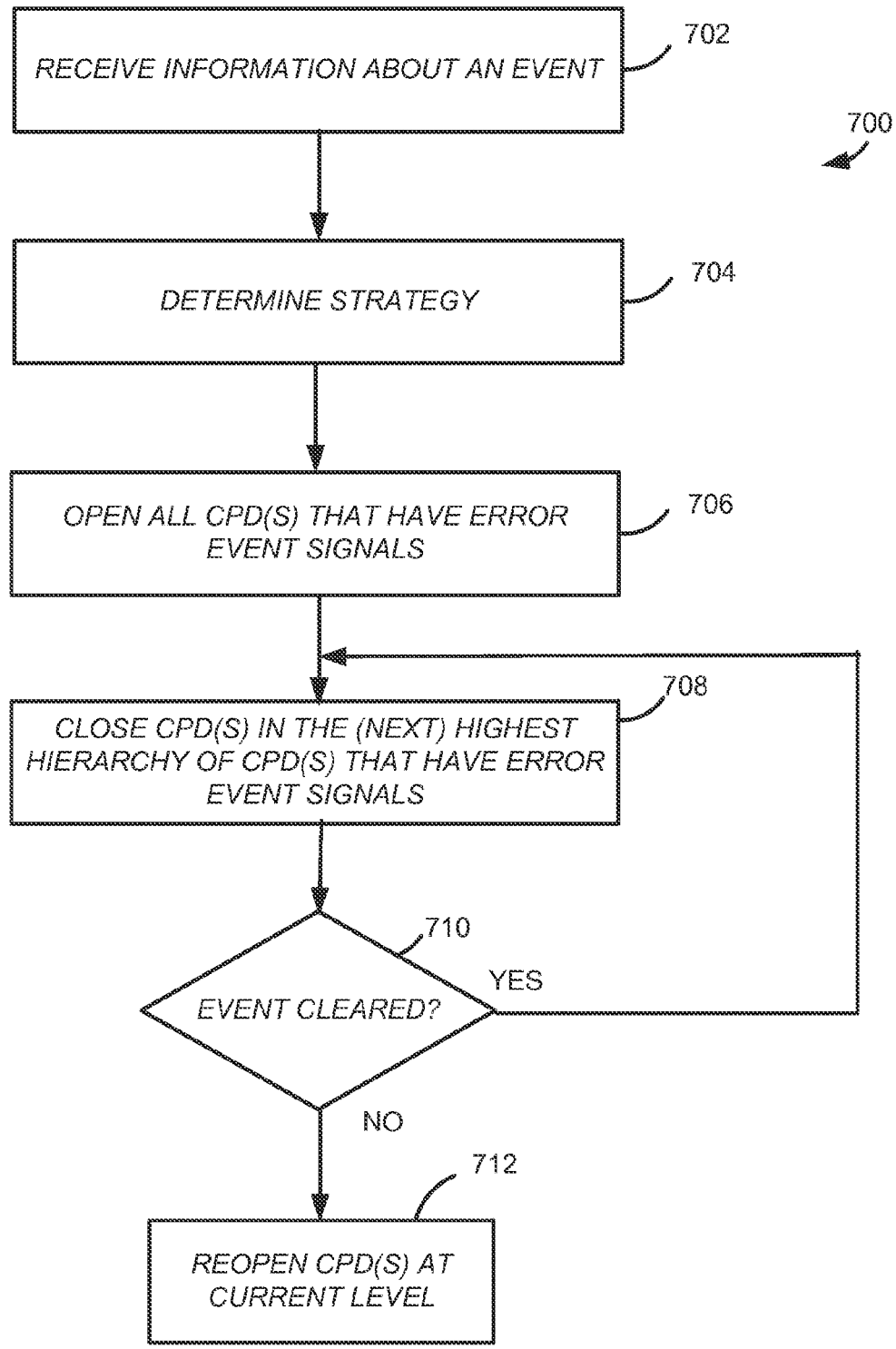
FIG. 7 is a flowchart showing yet another process for handling circuit protection devices in accordance with embodiments.

FIG. 7 shows an alternate process 700 for managing CPDs in a system, such as the CPD system 300 in accordance with embodiments. 702 and 704 are similar to 502 and 504, described above. At 706, the management component 101 instructs each of the CPDs that generated an event error signal to open. This operation assures that the circuit is protected for all devices and CPDs having the event and permits the management component to take action (e.g., later closing some of the CPDs) after the circuits are already safely protected.

At 708, the CPD(s) that are at the highest hierarchy from which error events were received are closed. At 710, a determination is made whether the error event has cleared. If so, then the process loops back to 708, where CPD(s) at the next highest hierarchy are closed. This process continues until information is received that the errors are not all clear and 710 branches to 712, where the most recently checked CPD(s) are reopened.

The process 700 immediately opens all circuits for a particular error event for the circuits that generate an error event signal. For example, when there is a short circuit at a device level such as at device 322, error events can be triggered at the device CPD 314, the rack CPD 306 and the room CPD 302. The process 700 first opens all these CPDs and then iteratively closes CPDs from the highest hierarchy downward until the location of the event is found. This iterative process may done with one cycle through 710 where the error event occurs at the highest order of the CPDs (i.e., in this example, at the room 304). However, in the case where a lower order CPD had generated an error event and that event has been propagated up the hierarchy, the iterative process permits higher order circuits to go back on line, thus limiting the number of devices that remain removed from power. The iterative process can occur over the course of milliseconds, thus avoiding a long period without power and possibly preventing devices that are not affected from going off power. As an example, the devices could be off power for as little a few milliseconds, or up to a minimum amount of time, such as 16 milliseconds, that is considered to be sufficient for all the devices to maintain operation during the interruption.

As described above, the agent/management component 408 can include part or all of the functions described for the management component 101. In fact, in embodiments, functions of the management component 101 can be fully performed by the agent/management components 408 of the CPDs in the system 300.

Figure 8:
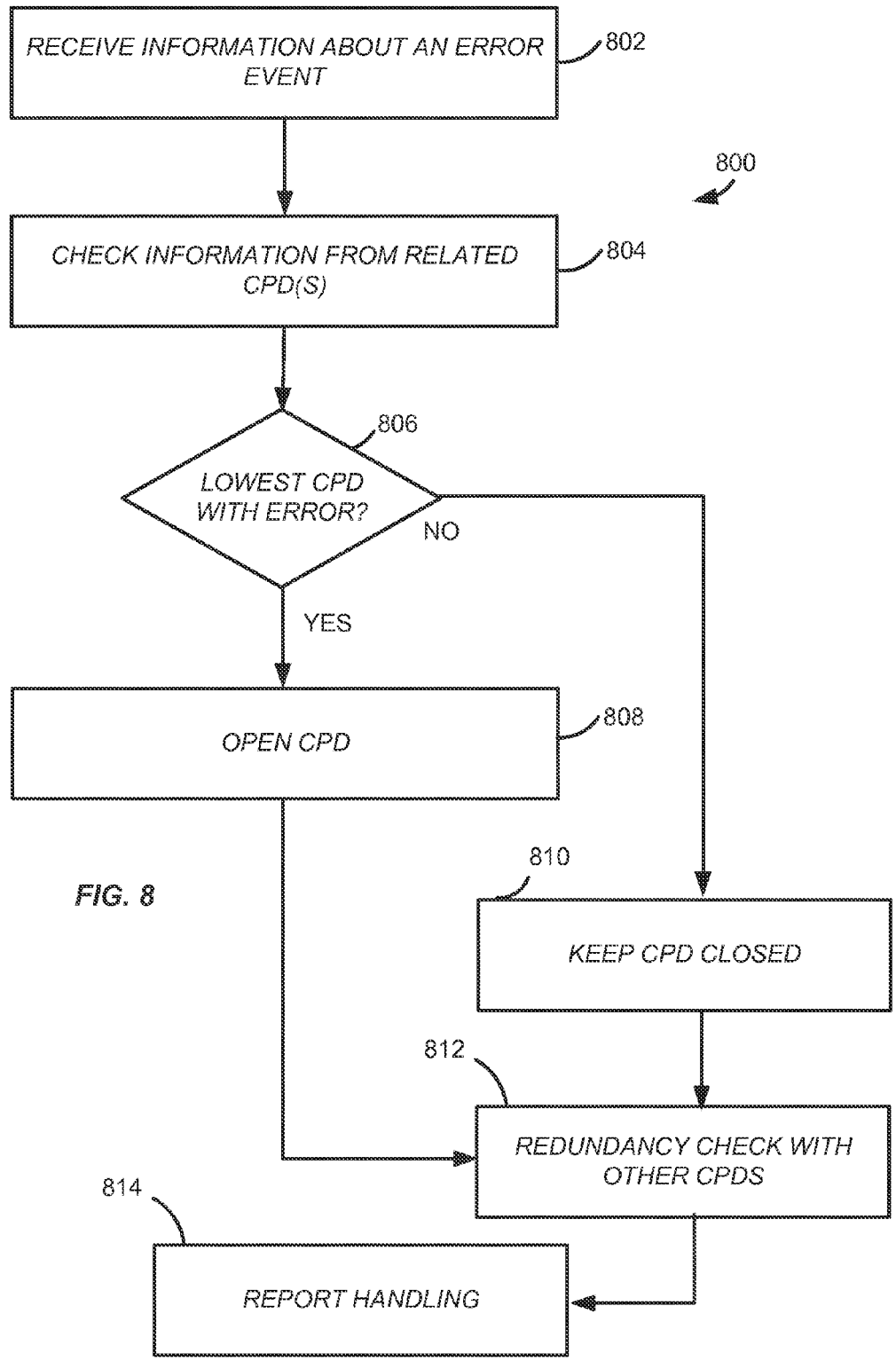
FIG. 8 is a flowchart showing still another process for handling circuit protection devices in accordance with embodiments.

FIG. 8 shows a process 800 in which features of the management component 101 are included in the agent/management component 408. At 802, error information is received, for example, from one of the sensors 402, 404, 406. In this example, the information is received by the agent/management component 408. At 804, the agent/management component 408 checks information from adjacent CPDs, for example, up and down the hierarchy of the CPD system 300 shown in FIG. 3. The check may be to see, for example, if any of these adjacent CPDs have received similar error information.

At 806, if the CPD is the lowest CPD of adjacent CPDs to have generated the error event information, then the process branches to 808, where the CPD is opened. If the CPD is not the lowest CPD to generate a fault, then 806 branches to 810, where the CPD remains closed. In either event, the process can proceed to 812, where the agent/management component 408 can instruct or otherwise arrange with the others CPDs to ensure that they agree on the CPD(s) to open are keep closed, (i.e., in this example, the lowest CPD in the hierarchy is to open). In the case of disagreement, a default action can occur, the safest of which is to open all CPDs that are at issue.

At 814, if desired, the CPD can report its handling of the error event, for example, to the management component 101. As described above, this reporting can be used to determine at which level in the hierarchy of the datacenter that an error occurred. Thus, a technician can focus maintenance or repair operations at the correct level. If different sensors are used, such as the sensors 402, 404, 406, then the report can include the type of circuit fault that occurred, such as a short circuit.

Figure 9:
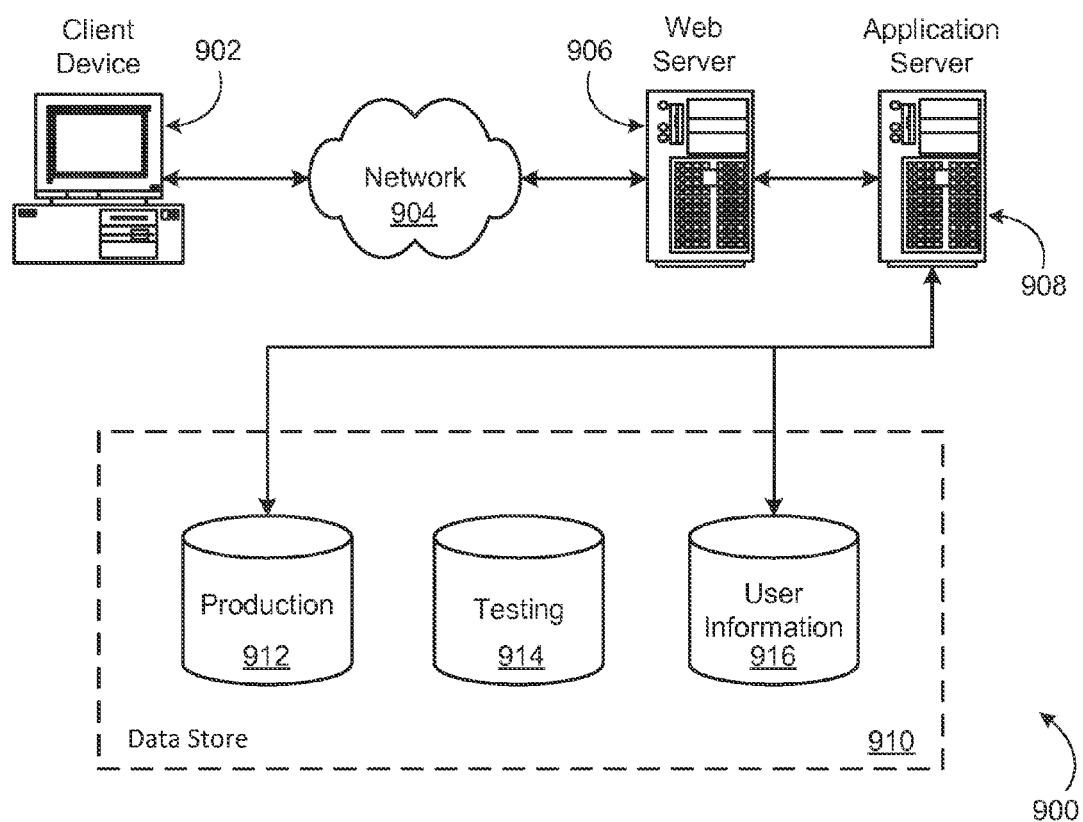
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server (s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for controlling circuit protection devices in a datacenter, comprising:
   under the control of one or more computer systems configured with executable instructions:
      receiving information about a circuit fault event from a plurality of circuit protection devices that provide circuit protection for a plurality of datacenter components in a datacenter, each of the plurality of circuit protection devices including a switch openable by the one or more computer systems to open a circuit in the datacenter;
      in response to the circuit fault event, accessing information about a hierarchy of said plurality of datacenter components in the datacenter; and
      based upon the information about the hierarchy, opening the switches of the circuit protection devices in the plurality of circuit protection devices that provide protection for the datacenter components in a lowest level of the hierarchy.

2. The computer-implemented method of claim 1, further comprising, after opening the switches of the circuit protection devices in the plurality of circuit protection devices that provide protection for the datacenter components in the lowest level of the hierarchy, when further information is received about the circuit fault event, opening the circuit protection devices in the plurality of circuit protection devices that provide protection for the datacenter components in a next lowest level of the hierarchy.

3. The computer-implemented method of claim 2, further comprising, providing information about handling of the circuit fault event.

4. The computer-implemented method of claim 1, further comprising, generating a report about which switches were opened as a result of the circuit fault event.

5. The computer-implemented method of claim 1, further comprising, if a predetermined time has passed after the circuit fault event, when further information is received about the circuit fault event, providing instructions for opening each of the switches of the plurality of circuit protection devices.

6. The computer-implemented method of claim 1, wherein opening the switches comprises issuing commands to the circuit protection devices.

7. A computer-implemented method for controlling circuit protection devices that provide circuit protection for a network of computer devices, comprising:
   under the control of one or more computer systems configured with executable instructions:
      receiving information about a circuit fault event from a plurality of circuit protection devices that provide circuit protection for a plurality of computer devices in a network, each of the plurality of circuit protection devices including a switch openable by the one or more computer systems to open a circuit in the network; and
      based upon the information about the circuit fault event and a hierarchy of the computer devices, changing the state of a subset of the switches of the plurality of circuit protection devices.

8. The computer-implemented method of claim 7, wherein changing the state of the subset of the switches comprises opening the switches of the circuit protection devices in the plurality of circuit protection devices that provide protection for the computer devices in a lowest level of the hierarchy.

9. The computer-implemented method of claim 7, wherein changing the state of the subset of the switches comprises opening each of the switches of the circuit protection devices in the plurality of circuit protection devices, then iteratively:
   closing the switches of the circuit protection devices in the plurality of circuit protection devices that provide protection for the computer devices in a highest level of the hierarchy;
   if the fault event does not recur, then closing the switches of the circuit protection devices in the plurality of circuit protection devices that provide protection for the computer devices in a next highest level of the hierarchy and iteratively closing the switches of the circuit protection devices down the hierarchy until the fault event recurs; and
   if the fault event recurs, opening the switches of the circuit protection devices that provide protection for the computer devices at a lowest level of the hierarchy where the switches of the circuit protection devices were closed.

10. The computer-implemented method of claim 9, further comprising, generating a report about which switches were opened and which were closed as a result of the circuit fault event.

11. The computer-implemented method of claim 7, further comprising, generating a report about which circuit protection devices changed state as a result of the circuit fault event.

12. The computer-implemented method of claim 7, further comprising, if a predetermined time has passed after the circuit fault event, when further information is received about the circuit fault event opening each of the switches of the plurality of circuit protection devices.

13. A datacenter environment, comprising:
   a plurality of datacenter components;
   a plurality of circuit protection devices for providing circuit protection for the plurality of datacenter components, each of the plurality of circuit protection devices including a switch openable to open a circuit in the datacenter;
   a data store for maintaining information about a hierarchy of the plurality of datacenter components;
   a management component, comprising:
      at least one memory that stores computer-executable instructions; and
      at least one processor configured to access the at least one memory, wherein the at least one processor is configured to execute the computer-executable instructions to collectively at least:
      in response to receiving information about a circuit fault event from each of said plurality of circuit protection devices, changing the state of a subset of the switches of the plurality of circuit protection devices.

14. The datacenter environment of claim 13, wherein changing the state of the subset of the switches comprises opening each of the subset of the switches.

15. The datacenter environment of claim 13, wherein changing the state of the subset of the switches comprises opening the switches of the circuit protection devices in the plurality of circuit protection devices that provide protection for the computer devices in a lowest level of the hierarchy.

16. The datacenter environment of claim 13, wherein changing the state of the subset of the switches comprises opening each of the switches of the circuit protection devices in the plurality of circuit protection devices, then iteratively:
   closing the switches of the circuit protection devices in the plurality of circuit protection devices that provide protection for the computer devices in a highest level of the hierarchy;
   if the fault event does not recur, then closing the switches of the circuit protection devices in the plurality of circuit protection devices that provide protection for the computer devices in a next highest level of the hierarchy and iteratively closing the switches of the circuit protection devices down the hierarchy until the fault event recurs; and
   if the fault event recurs, opening the switches of the circuit protection devices that provide protection for the computer devices at a lowest level of the hierarchy where the switches of the circuit protection devices were closed.

17. The datacenter environment of claim 13, wherein the management component further comprises instructions for generating a report about which circuit protection devices changed state as a result of the circuit fault event.

18. The datacenter environment of claim 13, wherein the management component further comprises instructions for, if a predetermined time has passed after the circuit fault event, if further information is received about the circuit fault event, opening each of the switches of the plurality of circuit protection devices.

19. One or more non-transitory computer-readable storage media having stored thereon executable instructions that, when executed by one or more processors of a computer system, cause the computer system to at least:
   maintain information about a plurality of datacenter components in a datacenter and a hierarchy of the datacenter components;
   receive information about a circuit fault event from a plurality of circuit protection devices in the datacenter, the plurality of circuit protection devices providing circuit protection for said plurality of datacenter components, each of the plurality of circuit protection devices including a switch openable to open a circuit in the datacenter; and
   in response to receiving the information about the event, change the state of a subset of the switches of the plurality of circuit protection devices based upon the information about the plurality of datacenter components.

20. The computer-readable storage media of claim 19, wherein the hierarchy comprises, from lowest to highest levels: devices, racks and rooms.

21. The computer-readable storage media of claim 20, wherein changing the state of the subset of the switches comprises opening each of the subset of the switches.

22. The computer-readable storage media of claim 21, wherein changing the state of the subset of the switches comprises opening the switches of the circuit protection devices in the plurality of circuit protection devices that provide protection for the computer devices in the lowest level of the hierarchy.

23. The computer-readable storage media of claim 22, further comprising further executable instructions that, when executed by one or more processors of a computer system, cause the computer system to at least, after opening the switches of the circuit protection devices in the plurality of circuit protection devices that provide protection for the datacenter components in the lowest level of the hierarchy, if further information is received about the circuit fault event, open the switches of the circuit protection devices in the plurality of circuit protection devices that provide protection for the datacenter components in a next lowest level of the hierarchy and continuing iteratively to open the switches of the circuit protection devices up the hierarchy until no further information is received about the circuit fault event.

24. The computer-readable storage media of claim 23, further comprising further executable instructions that, when executed by one or more processors of a computer system, cause the computer system to at least provide information about handling of the circuit fault event.

* * * * *